Jan. 30, 1951  J. B. McFALL  2,540,004
INTERMITTENT STOCK-FEEDING MACHINE
Filed June 9, 1947  5 Sheets-Sheet 1
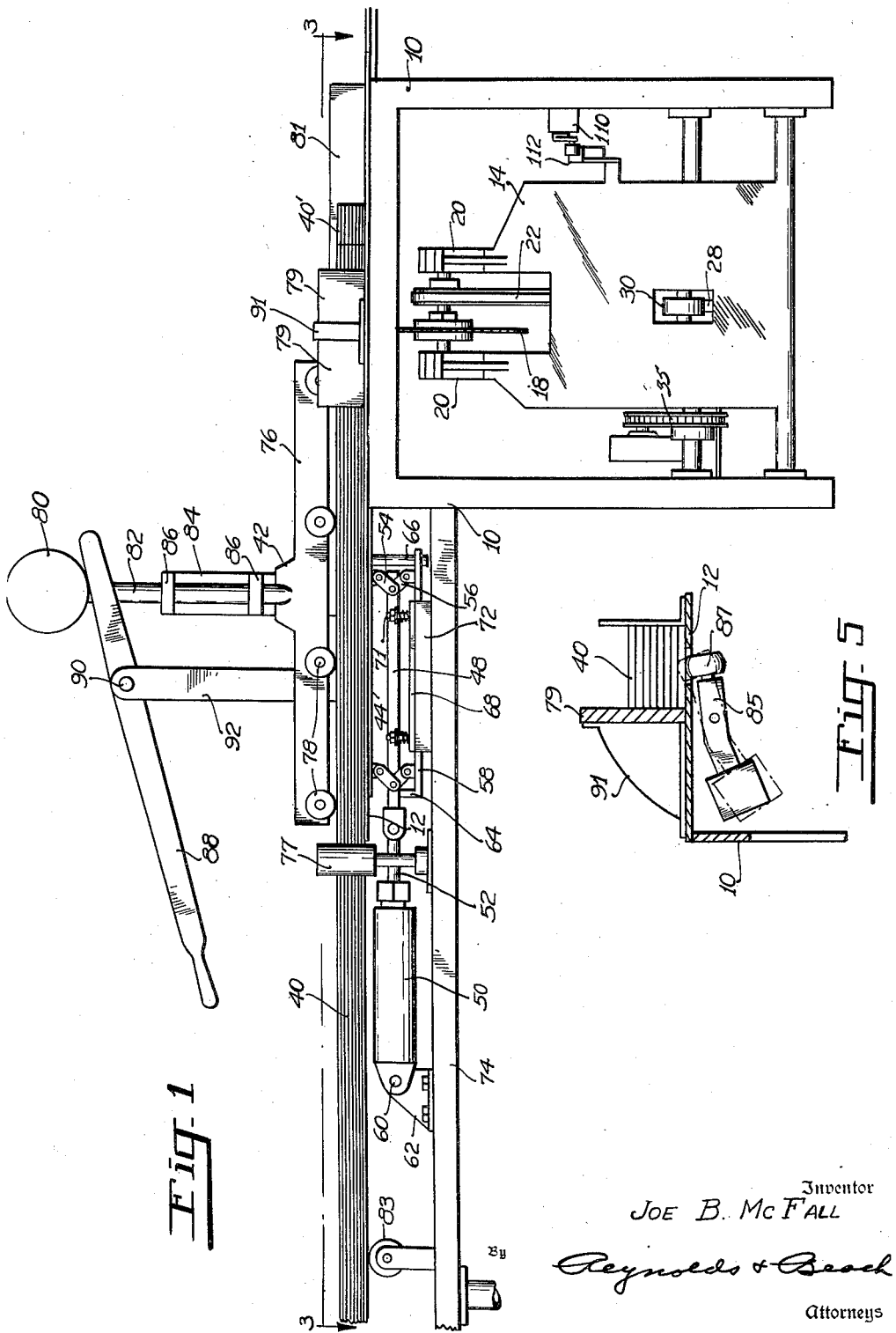
Inventor
JOE B. McFALL
By Reynolds & Beach
Attorneys

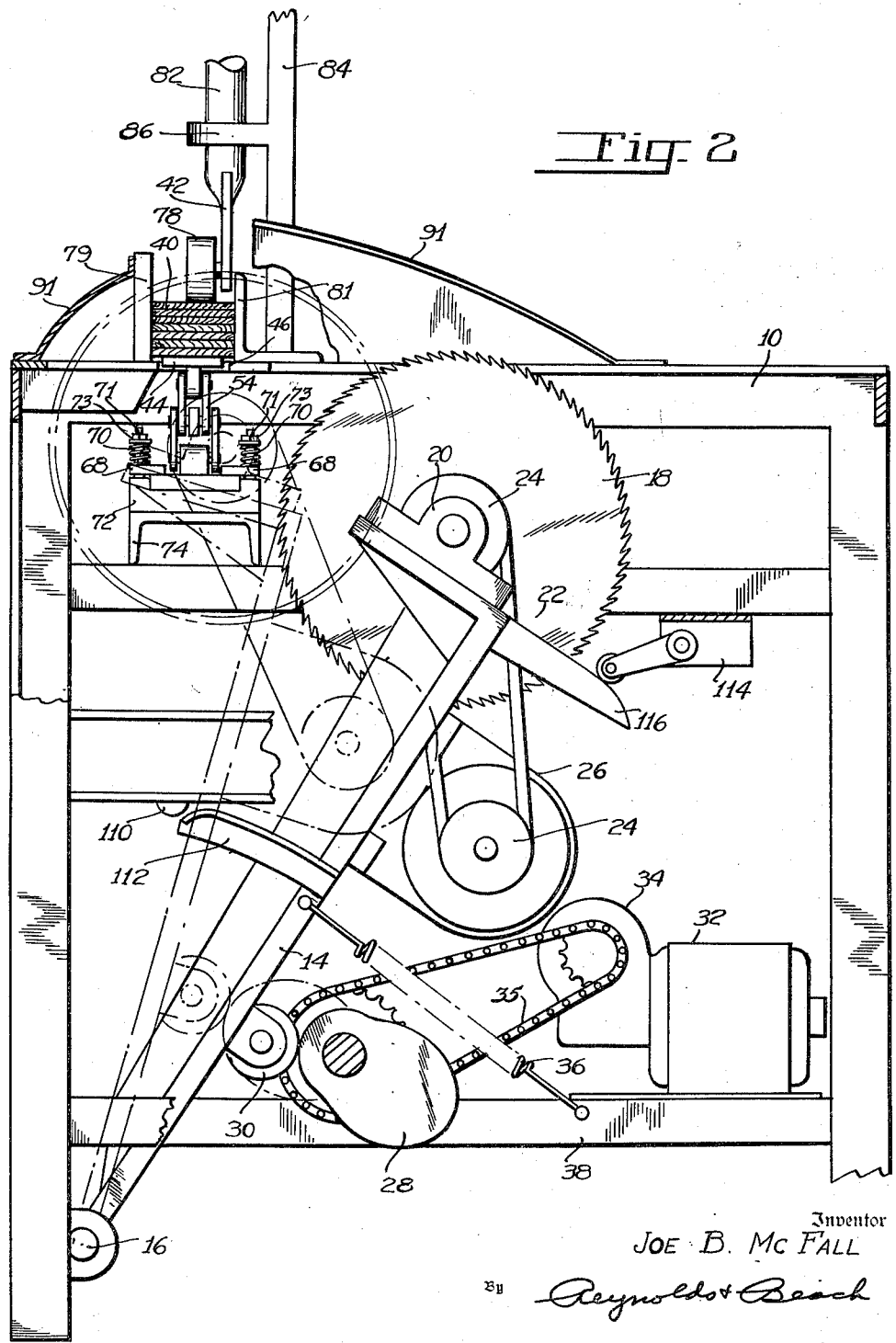

Jan. 30, 1951 J. B. McFALL 2,540,004
INTERMITTENT STOCK-FEEDING MACHINE
Filed June 9, 1947 5 Sheets-Sheet 3
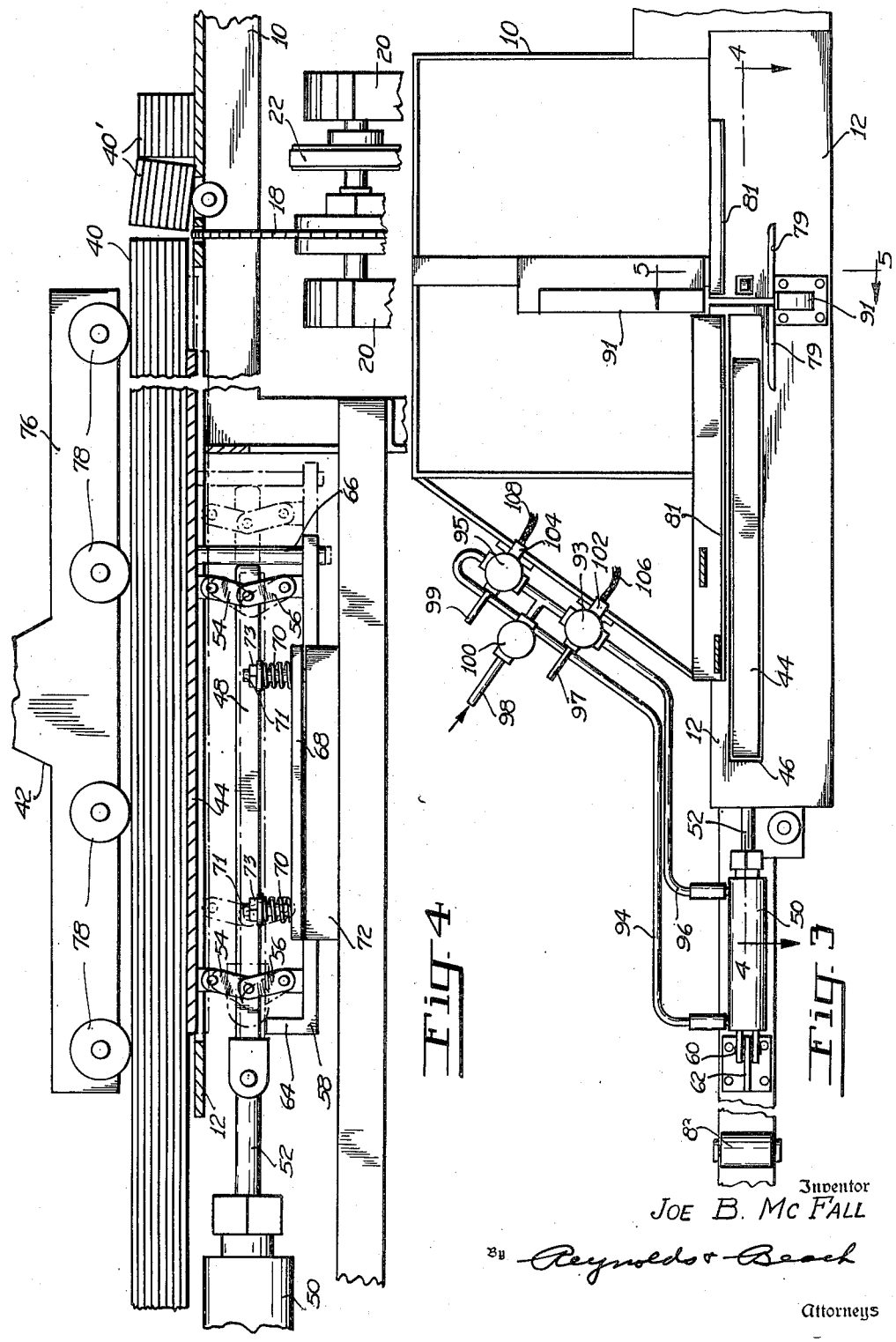
Inventor
JOE B. McFALL
By 
Attorneys

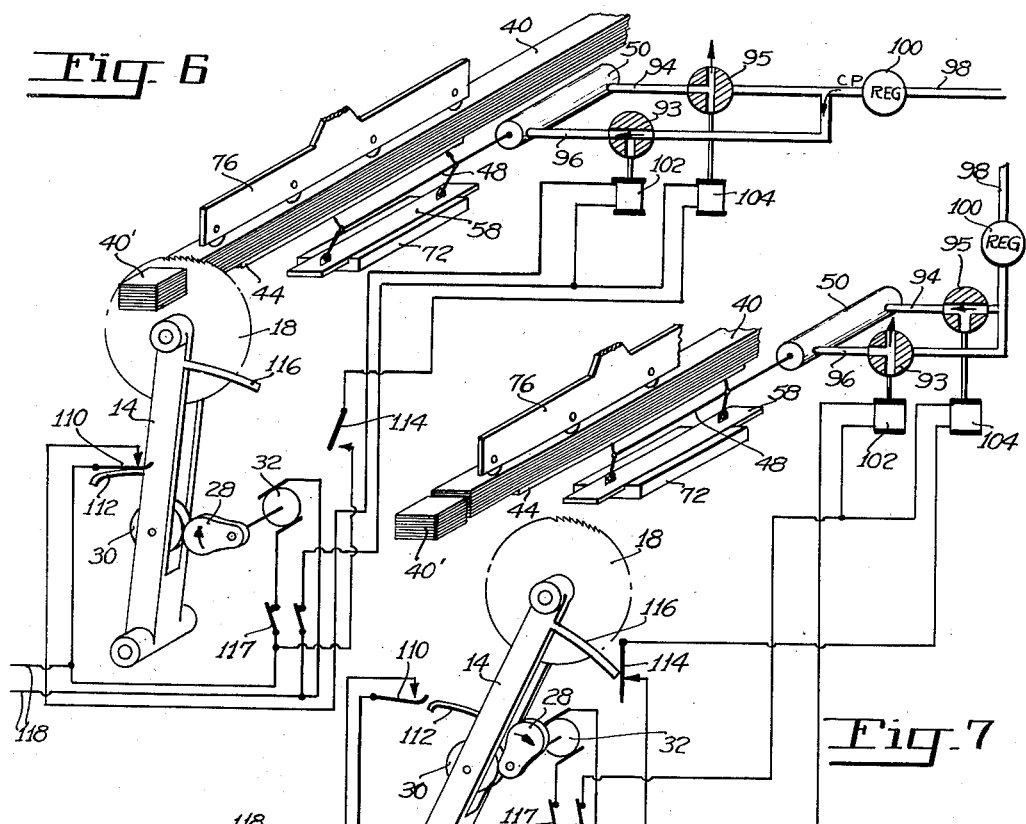

Jan. 30, 1951          J. B. McFALL          2,540,004
INTERMITTENT STOCK-FEEDING MACHINE
Filed June 9, 1947          5 Sheets-Sheet 5
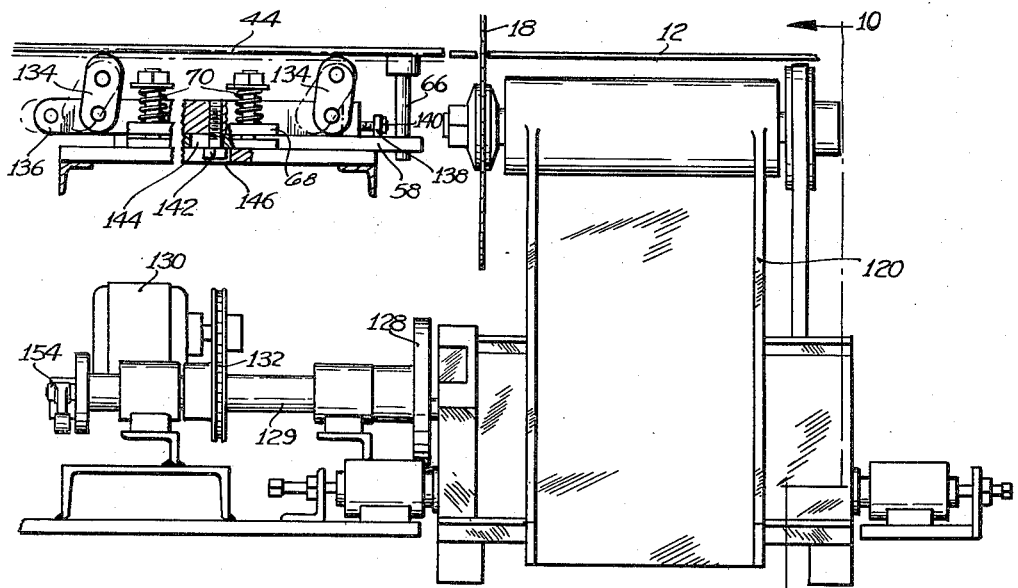
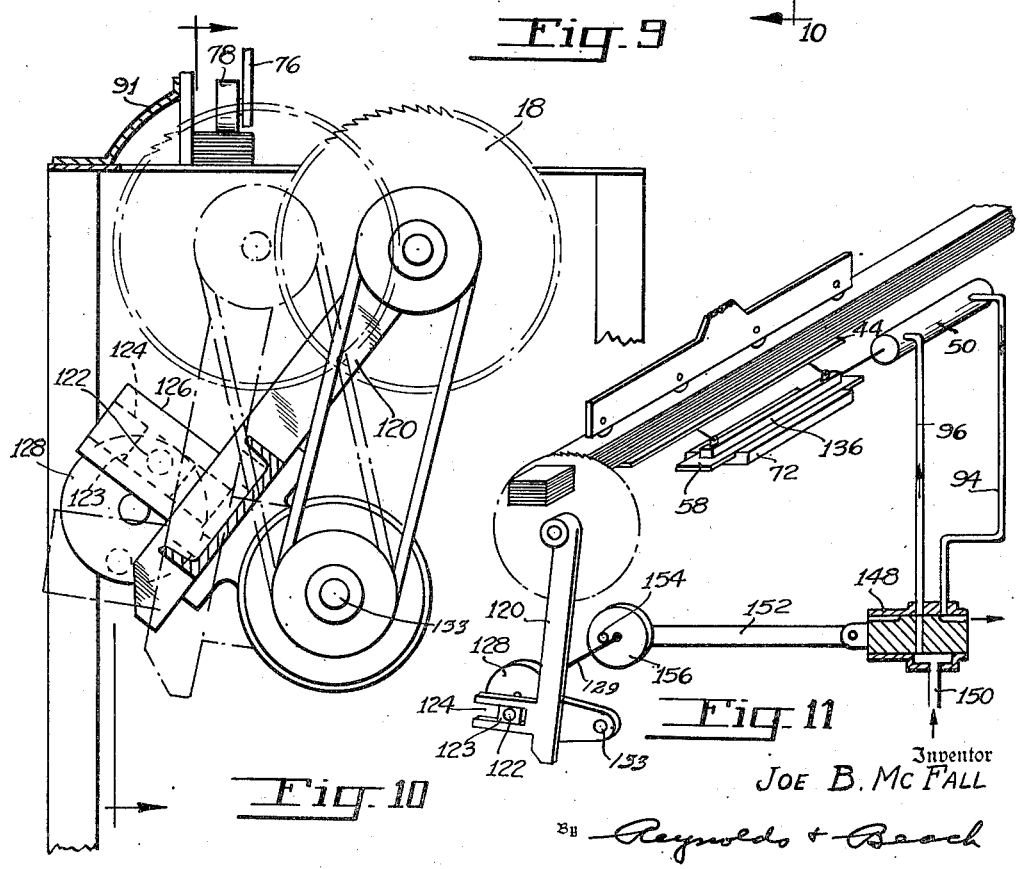
Inventor
JOE B. McFALL
By Reynolds & Beach
Attorneys Patented Jan. 30, 1951

2,540,004

UNITED STATES PATENT OFFICE 2,540,004

INTERMITTENT STOCK-FEEDING MACHINE

Joe B. McFall, Seattle, Wash., assignor to United States Plywood Corporation, Seattle, Wash., a corporation of New York Application June 9, 1947, Serial No. 753,523

10 Claims. (Cl. 144—242)

This invention relates to automatic stock cutting machines and similar devices employing retractable operating tools and coordinated means for advancing the material from which the stock is cut, incrementally, or in step-by-step manner, past an operating zone or station. The stock cut by such a machine may, for example, be substantially square pieces of veneer to be used for patches to fill holes in wood veneer made in removing knots, pitch pockets and other defects. In its illustrated forms the invention has been described by reference to its application in such patch stock cutting machines.

The automatic means in such machines for advancing the stock through the operating zone in coordination with the stroking of the operating tool must operate very accurately to maintain uniformity in the size of the stock cut. In the plywood industry, in patching damaged or faulty areas in veneer, it is necessary that the pieces of stock for the plugs or patches be precisely uniform in dimension to be handled properly by the patching machine. The number of patch stock pieces required by a manufacturer often approaches a value which cannot economically be produced by manually controlled tools.

With this in view, an object of the invention is to provide an improved patch stock cutting machine adapted for cutting automatically one or more pieces of stock material accurately into uniform lengths. A more specific object is to provide an inexpensive, reliable and accurate automatic work advancing mechanism adapted to be operated in coordination with the stroking motion of a retractable power saw or other tool, without marring the stock or producing excessive shock or vibration in the apparatus. Economy of motion in the operation of the machine parts, long life, minimum adjustment and adaptability for handling stock of different dimensions are understood objects.

These and other objects and advantages of the invention, including its various novel features and details of construction and operation, are described hereafter.

Figure 1 is a side elevation view of a patch stock cutting machine embodying the invention, viewed from the side away from the resting position of the saw.

Figure 2 is an end elevation view and Figure 3 is a plan view of the same machine.

Figure 4 is an enlarged side elevation view of a portion of the machine, principally illustrating one form of stock advancing mechanism.

Figure 5 (sheet 1) is a detailed end view, showing a mechanism to support a stack of severed sections of stock just beyond the saw, after cutting.

Figures 6, 7, and 8 are schematic electromechanical diagrams in top perspective, respectively illustrating three sequential phases of an operating cycle of this machine.

Figure 9 is a partial elevation side view of the patch stock cutting machine embodying an alternative type of stock advancing means, and Figure 10 is an end elevation view of this machine seen looking at the saw end thereof, while Figure 11 is a top perspective diagrammatic view illustrating the means for controlling the stock advancing mechanism in coordination with the movable saw carriage.

Customarily, patch stock cutting machines are designed for handling wood strips advanced horizontally between guides into the cutting zone. The cut-off saw is usually supported on a swinging carriage arm for stroking it through the zone intermittently, each time the stock has been postioned for cutting. Manual cutting apparatus cannot be operated rapidly because of the attention required both in the control of the saw carriage arm and in feeding and removing the stock.

In the machine of Figures 1 to 5, inclusive, the saw carriage arm is automatically stroked through the cutting zone intermittently, in timed relation with the forward step-by-step advancement of the stock. The stock materials are thus cut into uniform lengths automatically without attention of an operator other than to supply strips and remove cut stock.

The machine comprises a frame structure 10 on which is mounted a strip-supporting table 12 (Figures 4 and 5) slotted to receive a saw 18. The shaft carrying the saw is journaled horizontally in a suitable mounting 20 carried at the upper end of a swinging carriage 14 and is driven by a belt 22 connecting pulleys 24. The lower pulley is rotated by an electric motor 26 mounted on the under side of the carriage arm. In Figure 2, such arm is pivotally mounted at its base on a horizontal shaft 16 journaled in the base of the machine. The arm is shown in solid lines in its return or resting position and in dot-dash lines in its forward position at the end of the cutting stroke.

For oscillating the saw back and forth intermittently through the cutting zone a quick-return motion type power drive has been provided for swinging the arm 14, in the form of a specially designed rotary cam 28 engaging a cam follower roll 30 carried by the saw arm 14. The cam drive unit comprises an electric motor 32 and a gear reduction box 34, driving the cam through a chain and sprocket drive 35. The cam roll 30 is urged continuously into contact with the cam's periphery by the action of a tension spring 36 having one end connected to the carriage arm 14 and its other end anchored to a crosspiece 38 of the machine frame 10. In accordance with the cam design, when the motor 32 is in operation the stroking movement of the carriage arm is such that the saw is advanced at a rapid rate into cutting position, moved relatively slowly through the cutting zone, first forwardly and then rearwardly, and quickly returned to its resting position, dwelling for a period at either end of its stroke. During withdrawal of the saw from the cutting zone to its rest position, a new section of the strip stack is advanced through the cutting zone transversely of the path of the saw.

When setting up the machine for operation a stack of stock material 40, such as veneer strips, to be cut is placed on the supporting table 12 under the pressure of a holddown rider member 42. The stock, in being fed towards the cutting zone, is engaged intermittently by a retractable platform 44, representing any suitable stock-engaging device actuated in a manner to be described, and comprising part of the stock feeding mechanism. When so engaged, the stock is raised free of the support 12, carried toward the cutting zone by the feed stroke of the platform and returned to the table 12 in a new cutting position. The platform then retracts from engagement with the stock and is returned transversely of the stock to its starting position for the succeeding feed stroke. To allow passage of the platform to engage the stock for a feeding operation, the supporting table 12 is slotted at 46, although the platform might be arranged otherwise alongside the support, such as being split and straddling the support.

The motion of the platform is effected by fluid actuating means acting through a reciprocative rod 48 and comprising a fluid cylinder 50 housing a coacting piston fixed to a piston rod 52 which, in turn, is pivotally connected to the rod 48. Movement of the piston and rod 52 is determined by controlling the supply of fluid under pressure to the opposite ends of the cylinder, the resulting reciprocation of rod 48 being converted into motion of the platform by the feed mechanism to be described, first laterally outward or away from such rod and then lengthwise in one direction, and subsequently laterally inward or toward such rod and lengthwise in the return direction.

The feed mechanism includes a toggle linkage, in one form, shown in Figures 1 to 8, inclusive, comprising dual pairs of links 54 and 56, connected by common pivots to the rod 48, the upper links being pivotally connected to lugs projecting downwardly from the underside of the platform 44, and the lower links connected to lugs projecting upwardly from a horizontal friction or resistance slider member 58, near its opposite ends. Strips 68 are pressed against the slider member by loading compression springs 70, encircling bolts 71 mounted on a slider supporting member 72 and extending through holes in strips 68. The pressure of such springs may be varied by adjustment of springs retaining nuts 73 threaded on these bolts, to vary their degree of compression for altering the amount of friction applied to the slider.

The linkage composed of links 54 and 56 is contracted prior to initiation of the outward or feed movement of piston rod 52 and rod 48. The slider initially is held against lengthwise movement by the friction strips 68 pressed against it. A vertical post 66, mounted on the underside of platform 44 and projecting downward through a hole in slider 58, interconnects such platform and slider to maintain them always in lateral registry, so that the platform is prevented from moving lengthwise as long as the slider is held against such movement. Such post, however, does not prevent relative separating movement of the slider and platform in a lateral direction.

As the rod 48 is moved outward, its first action is to expand the linkage by moving its links 54 and 56 toward alignment while the slider 58 is held stationary, and as the linkage is thus expanded it exerts a considerable upward thrust against the platform 44, thereby raising the stock off its support 12. Such expansion of the linkage is limited by the end of rod 48 abutting the post 66, which is secured to the platform in the path of the rod, such permissible linkage expansion being sufficient for the platform to lift the stock free of the supporting table 12, so that it may be advanced. When the platform has thus been raised, the direct pressure of rod 48 against the stop post overcomes the friction of the clamping bars 68 on the slider 58, so that the entire assembly, including the slider, the platform in raised position, and the linkage in expanded condition moves forward, thus advancing the stock through the cutting zone. During such movement, the post 66 positively interconnects the platform and slider for conjoint lengthwise movement.

In Figure 4, the parts drawn in solid lines have been shown just as the linkage reaches its limiting expanded position effected by the endwise outward thrust of the piston rod 52 and rod 48. In Figure 4, the parts are shown in dot-dash lines prior to initial reciprocation of piston rod 52 and rod 48. The dot-dash line showing illustrates the parts in their positions of maximum advance, having fed across the cutting zone the next section of the strip stack to be cut off. The return of the parts to their original positions occurs in reverse sequence, platform 44 being retracted toward rod 48 upon initiation of the reverse movement of such rod, because of the friction exerted on slider 58 by the springs 70.

The amount of linkage contraction is limited by a stop-rest 64 mounted on the slider, onto which the rod 48 drops as it approaches the slider member. By such contraction of the linkage, the platform 44 is depressed below the upper surface of the table 12 so that again the stack of strips rests on the table. Continued retracting movement of piston rod 52 and rod 48 will withdraw the rod, linkage, slider and the platform assembly into the left dot-dash line position of Figure 4 ready for initiation of the next feeding movement. To accommodate the rising and falling movements of rod 48 during expansion and contraction of the linkage, it is pivotally connected to piston rod 52, and the cylinder 50 is pivotally mounted at its end remote from piston rod 52, on a pin 60 retained in a bracket 62 which is bolted to the frame 74 of the machine as shown in Figures 1 and 3.

The holddown rider member 42 which presses the stock firmly against the table 12 during cutting and against the platform 44 during feeding of the stock, is provided with a lower framework 76 having stock-engaging rollers 78 located at spaced intervals along the stock's line of advance. The amount of downward pressure thus exerted is determined by a weight 80 upheld by a vertical post 82 fixed to the frame 76. The advantage of using a weight rather than a spring type of device lies in the resulting constant pressure maintained against the stack of veneer strips irrespective of its height. The rider is free to move vertically when the stock is raised by the feeding platform 44, because it derives its lateral support from a vertical supporting member 84 provided with laterally projecting lugs 86 having holes through which slides the vertical post 82. The rider may be lifted for inserting fresh stock beneath it by swinging a lever member 88 pivoted on a pin 90 carried by an upright mounting 92.

To guide the stock as it is advanced toward the saw, guide means, such as a vertical roller 77 and vertical plates 79 and 81, may engage opposite sides of the work. To support the end of long strips of stock remote from the cutting zone a horizontal supporting roller 83 can be mounted in a position spaced from table 12, which reduces the drag of the stock when it is lifted by the platform and carried forward. The saw is shown protectively shielded by means of suitable hoods 91. In addition, new sections of stock cut off by the saw are lifted slightly and rolled forward by the device illustrated in Figure 5, comprising an arm 85 pivoted intermediate to its ends and carrying at one end a free turning roller 87 which is normally projected up through a suitable slot in the table 10 into contact with the work by counter weighting the other end of the arm.

In controlling the introduction of fluid into the fluid cylinder 50 for operating the work feed mechanism, a fluid system is provided having a pair of two-way control valves 93 and 95 (see Figures 3, 6, 7 and 8). In operation, the valves are alternately opened to the through-position, for transmitting fluid, such as compressed air, to the cylinder through the pipes 94 and 96 from a common supply pipe 98 and regulator 100, and closed to the exhaust position for relieving the fluid pressure in the cylinder into pipes 97 and 99. Conveniently, the valves may be solenoid controlled as shown, separate solenoids 102 and 104 being connected to each of the valves.

The solenoids are connected to carriage-arm-operated control switches 110 and 114, the switches being shown in different operative positions in Figures 6 to 8, inclusive, in their relation with the other functional components of the control system of the machine. In these figures the mechanical parts of the system have been shown rather diagrammatically for purposes of clarity, although they bear the same numerical designation as before. Normally open switch 110, closable to control valves 93 and 95 for effecting retraction of rod 48, is adapted to be closed by a suitable actuating member, shown as a switch-engaging finger 112 projecting forwardly from the saw carriage arm 14, which contacts the switch on the forward stroke of the saw. Normally open switch 114, closable to control valves 93 and 95 for effecting projection of rod 48 to feed the stock forward, is adapted to be closed on the return stroke of the saw by engagement with it of an actuating member shown as the finger 116 projecting rearwardly from the back of the carriage arm. Switches 112 and 114 are in circuit with solenoids 102 and 104 connected to move valves 93 and 95, respectively. Closing power switch 117 applies voltage over input leads 118 to the circuits, including the carriage arm drive motor 32.

In Figure 6, illustrating the extreme forward position of the saw following a cut, solenoid 102 is energized through closed switch 110, opening valve 93 to connect the supply of fluid under pressure to the left end of cylinder 50, and solenoid 104 is deenergized, switch 114 being open, so that valve 95 is arranged to exhaust the right end of cylinder 50. The pressure of the fluid in the left end of such cylinder retracts the rod 48 and the platform 44. This condition is first reached, during the forward movement of the carriage arm 14, at the instant switch 110 is closed by the finger 112.

In Figure 7 the machine has just left the operational phase of Figure 6 and has reached the stage where the saw is substantially fully retracted and the stock advancing stroke of rod 48 is about to commence. By the rearward movement of arm 14 finger 112 has been withdrawn from engagement with switch 110, enabling it to open, and switch 114 has been closed by engagement of finger 116 with it, resulting in energization of solenoid 104 to open valve 95 for connecting the supply of fluid under pressure to the right end of cylinder 50. Since solenoid 102 is deenergized, valve 93 is closed to exhaust the left end of cylinder 50, thereby providing a stock feeding thrust to the rod 48. Because of the substantial dwell time of the saw carriage arm 14 in this rearward position, occasioned by the nearly constant radius of the larger end or lobe of cam 28, a considerable fraction of the operation cycle is thus afforded for the mechanism to advance the stock.

Following the dwell period of the saw arm in its rearward position, its swing forward is initiated, as shown in Figure 8, withdrawing finger 116 from the switch 114 so that it opens to deenergize solenoid 104 which releases fluid pressure in the right end of cylinder 50. Preferably, for a brief subsequent interval, during which the saw is being swung forward to the point where switch 110 is again closed, pressure equalization occurs in the opposite ends of the cylinder. As a result, the stock-advancing platform remains stationary during this period, and its retraction is initiated an instant later when further forward movement of the saw carriage arm closes switch 110, energizing solenoid 102 and opening valve 93 as explained previously.

In the modified machine shown partially in Figures 9 and 10, the saw 18 and the saw carriage arm 120 derive their swinging movement from a crank or an eccentric pin 122 interconnecting a driving wheel 128 and a block 123 which is adapted to slide reciprocatively in a groove 124 formed in a driving arm 126 fixed to the carriage arm. The wheel 128 is rotated by a motor 130 which acts through a chain drive mechanism 132. The carriage swings about the drive pulley shaft 133.

As in the type of machine described previously, the stock feeding platform 44 is operated by a fluid actuated piston, and the devices are similar also in other respects. Thus, the apparatus is provided with a slider 58 coupled to the platform 44 by a vertical post 66 extending slidably through a hole in the slider, and with friction strips 68 pressed against the slider by the force of springs 70, the slider being guided for longitudinal movement by a retaining member 72. A form of linkage drive system for the platform different from that incorporated in the machine of Figure 1 is used in this instance. A single-link type of toggle mechanism is employed, including links 134 spaced lengthwise of platform 44, and pivotally connected by their upper ends to the platform and by their lower ends to rod 136. A modified arrangement of stops is also provided, for limiting the expansion and contraction of the linkage means.

The forward movement of the rod 136 is limited by an adjustable stop comprising a lug 138 extending upwardly from the slider through which lug is threaded a bolt 140, the end of the bolt adjacent to rod 136 being positioned during its stock feeding in the path of such rod, to be engaged by such rod end. On its return stroke, the rod 136, having a downwardly projecting bolt 142 threaded into it, is stopped at the point of contact of such bolt with the end wall of a longitudinal slot 144 formed in the slider. The head of the bolt is shown as sliding in a wider opening 146 in the slide supporting and guiding member 72, and acts to prevent the rod 136 from rising during its reciprocation.

The actuating and control means for the stock feed mechanism shown in Figure 11 includes a fluid actuating system comprising the cylinder 50 and the pipes 94 and 96 which are connected to a selector slide valve 148 controlling communication pipe 150 between a supply of fluid under pressure and the opposite ends of cylinder 50. The valve operating mechanism includes a link 152 connected between the valve and a crank pin 154 which is mounted on a disc 156 secured to the end of drive shaft 129 remote from the saw carriage arm crank wheel 128. Consequently, crank 154 is rotated synchronously with, but phased at an appropriate angle from, the crank pin 122 on disc 128. The valve construction here shown represents the type in which reciprocation of the valve slider alternately connects one of pipes 94 and 96 to the supply pipe 150 and connects the other of these pipes to exhaust.

In the operation of the machine, desired delayed action of the valve 148 at its alternate supply positions is obtained as a result of the nature of the movement imparted to the link 152 by the crank pin 154. A similar type of movement is imparted to the saw carriage arm by the crank pin 122 in giving the saw a quick-return motion, and the arrangement provides the desired coordination between the movement of the saw and the stock feed movement effected by the action of valve 148.

Among its many advantages, both forms of the apparatus may be seen to operate in an accurate, positive and nicely regulated manner in feeding the stock. It will be understood that the novel apparatus provided by the invention in accomplishing this may be adapted in various ways to similar machines intended for other purposes.

I claim as my invention:

1. Intermittent work feed mechanism comprising an elongated generally horizontal work support having an opening therein, a work-engageable element normally disposed beneath said support opening but guided for movement first upwardly to project through said opening into contact with, and raise, the work on said support, generally horizontally lengthwise of said support, to feed the work so engaged, downwardly to retract beneath said support, and then generally longitudinally to its initial position, and means intermittently operable so to move said work-engageable element to feed the work, comprising a drive member disposed beneath said support and guided for reciprocation generally longitudinally thereof, slide means guided for reciprocation longitudinally of said support and interconnected with said work-engageable element for conjoint movement therewith longitudinally and for vertical movement of said element relative to said slide means, adjustable-force restraining means cooperating with said slide means to exert an adjustable force thereon tending to restrain longitudinal movement thereof in either direction, a link pivotally interconnecting said drive member and said work-engageable element, said link being inclined at a variable angle upwardly and forwardly in the direction of work feed, from its connections on said drive member and work-engageable element, respectively, and stop means cooperating between said reciprocable drive member and said slide means to limit positively relative longitudinal movement thereof in both directions, at opposite relative positions thereof corresponding to different angles of inclination of said link, and thereby corresponding to the extreme upper and lower positions of said work-engageable element actuated by said drive member through said links, slide means and stop means.

2. Intermittent work feed mechanism comprising an elongated generally horizontal work support having an opening therein, a work-engageable element normally disposed beneath said support opening but guided for movement first upwardly to project through said opening into contact with, and raise, the work on said support, generally horizontally lengthwise of said support, to feed the work so engaged, downwardly to retract beneath said support, and then generally longitudinally to its initial position, and means intermittently operable so to move said work-engageable element to feed the work, comprising a drive member disposed beneath said support and guided for reciprocation generally longitudinally thereof, slide means guided for reciprocation longitudinally of said support and interconnected with said work-engageable element for conjoint movement therewith longitudinally and for vertical movement of said element relative to said slide means, restraining means cooperating with said slide means to exert a force thereon tending to restrain longitudinal movement thereof in either direction, link means pivotally interconnecting said drive member and said work-engageable element, including a link inclined at a variable angle upwardly and forwardly in the direction of work feed, relative movement between said reciprocable drive member and said slide means in one direction effecting swinging of said link to raise said work-engageable element into contact with the work and relative movement therebetween in the opposite direction effecting swinging of said link to lower said work-engageable element out of contact with the work.

3. Intermittent work feed mechanism comprising an elongated generally horizontal work support having an opening therein, a work-engageable element normally disposed beneath said support opening but guided for movement first upwardly to project through said opening into contact with, and raise, work on said support, generally horizontally and lengthwise of said support to feed the work so engaged, downwardly to retract beneath said support, and then generally longitudinally to its initial position, and means intermittently operable so to move said work-engageable element to feed the work.

comprising a drive member disposed beneath said support and guided for reciprocation generally longitudinally thereof, slide means guided for reciprocation longitudinally of said support and interconnected with said work-engageable element for conjoint movement therewith longitudinally and for vertical movement of said element relative to said slide means, adjustable frictional restraining means cooperating with said slide means to exert an adjustable frictional force thereon tending to restrain longitudinal movement thereof in either direction, a toggle linkage comprising a pair of generally oppositely extending links pivotally interconnected at their adjoining ends with said drive member, and connected at their opposite ends, one to said slide means and one to said work-engageable element, said links defining a variable angle, less than 180 degrees, opening forwardly in the direction of work feed, and stop means cooperating between said reciprocable drive member and said slide means to limit positively relative longitudinal movement thereof in both directions at opposite relative positions thereof corresponding to different angles formed by said links, and thereby corresponding to the extreme upper and lower positions of said work-engageable element actuated by said drive member through said links, slide means and stop means.

4. In a machine for performing successive operations at spaced points along a length of stock, in combination with stock supporting means, a liftable platform positioned in relation to said supporting means for lifting the stock therefrom and advancing it for depositing the stock in incrementally advanced position on said supporting means, and platform actuating mechanism comprising a drive member movable parallel to the direction of advance of the stock, linkage means including a link interconnecting said platform and said drive member to raise and lower said platform into and out of contact with the work, respectively, by swinging of said link in a generally vertical plane, between different angular positions by reciprocation of said drive member, a follower member guided for reciprocation generally parallel to said drive member, means interconnecting said platform and said follower member for conjoint longitudinal reciprocation thereof in a direction parallel to the line of advance of the stock, but for relative vertical separation of said platform and follower member, means restraining movement of said follower member during swinging of said link into platform-raised position by movement of said drive member by a predetermined amount in one direction, to raise the stock from said supporting means, means thereafter operable to connect said platform and follower member with said drive member for movement conjointly in stock advancing direction by further movement of said drive member beyond said predetermined amount in the same direction, movement of said drive member in the opposite direction effecting reverse swinging of said link and lowering of said platform to deposit the stock on said supporting means, and thereafter to return said platform and follower member to the initial position.

5. The combination defined in claim 4, wherein the follower member comprises a slider, and the restraining means comprises frictional means operatively engaging such slider to restrain longitudinal movement thereof against any force below a predetermined value, corresponding to that effective to restrain movement of said slider until raising of the platform fully into stock-lifted position.

6. The combination defined in claim 5, wherein the linkage comprises a toggle linkage including a pair of oppositely extending links connected at their adjoining ends to the drive means and at their opposite ends to the platform and slider, respectively.

7. The combination defined in claim 5, wherein the frictional restraining means comprises a friction element engageable with the slider, and spring means operable to press the friction element against said slider resiliently by a predetermined force.

8. The combination defined in claim 7, and means operable to pre-load the spring means by adjustable amounts to vary the force applied by the friction element to the slider.

9. Step-by-step work feed mechanism comprising in combination with work-supporting means and yieldable work holddown means, a work-engageable member guided for reciprocation both vertically and longitudinally to raise the work from said supporting means, advance it, redeposit it and return, a slide member guided for reciprocation only longitudinally, parallel to work feeding movement of said work-engageable member, a vertical guide member depending from said work-engageable member and connected to said slide member to constrain said members for conjoint longitudinal movement while permitting relative vertical movement thereof, frictional means engageable with said slide member to exert a selected restraining force against reciprocation thereof, drive means reciprocable in a direction parallel to said work-engageable and slide members, linkage means including a link pivotally interconnecting said work-engageable member and drive member and swingable between one acute angle of inclination relative to the line of reciprocation of said drive means, corresponding to lowered position of said work-engageable member, and a greater acute angle of inclination thereof, corresponding to raised position of said work-engageable member, by reciprocation, forward and back, of said drive means in the direction of work feed and oppositely, respectively, and stop means operable to limit relative movement of the drive means and said slide member accompanying swinging of said link, at extreme relative positions corresponding to said angular positions of such link, respectively, restraining force on said slide member preventing longitudinal movement thereof and of said work-engageable member during swinging of said link between its said positions.

10. Mechanism defined in claim 9 wherein the holddown means comprises a weight-actuated member having a plurality of work engageable rollers, and means to lift said weight-actuated member to raise said rollers from the work simultaneously for insertion and removal of work from the supporting means.

JOE B. McFALL.

REFERENCES CITED

The following references are of record in the file of this patent:

UNITED STATES PATENTS

| Number | Name | Date |
| --- | --- | --- |
| 1,721 | McDowell | Aug. 12, 1840 |

(Other references on following page)

UNITED STATES PATENTS

| Number | Name | Date |
|---|---|---|
| 189,628 | Kautz | Apr. 17, 1877 |
| 293,037 | Kautz | Feb. 5, 1884 |
| 410,777 | Abbott | Sept. 10, 1889 |
| 801,744 | Schilbach | Oct. 10, 1905 |
| 813,908 | Miller | Feb. 27, 1906 |
| 990,829 | Bell | May 2, 1911 |
| 991,091 | Russ | May 2, 1911 |
| 1,278,814 | Johnson | Sept. 10, 1918 |
| 1,428,036 | Johnson | Sept. 5, 1922 |
| 1,805,906 | Dennis | May 19, 1931 |
| 1,880,112 | Shmyroff et al. | Sept. 27, 1932 |
| 2,353,239 | Horstkotte | July 11, 1944 |

FOREIGN PATENTS

| Number | Country | Date |
|---|---|---|
| 140,167 | Austria | Jan. 10, 1935 |
| 328,579 | Germany | Oct. 30, 1920 |
| 504,211 | Germany | Aug. 1, 1930 |